United States Patent
Sun et al.

(10) Patent No.: US 12,521,628 B2
(45) Date of Patent: Jan. 13, 2026

(54) METHOD AND SYSTEM FOR FLEXIBLE GRAPHICS ENHANCEMENT AND EXECUTION

(71) Applicant: INNOPEAK TECHNOLOGY, INC., Palo Alto, CA (US)

(72) Inventors: Hongyu Sun, Palo Alto, CA (US); Chen Li, Palo Alto, CA (US); Chengeng Li, Palo Alto, CA (US); Aurelien Chanot, Palo Alto, CA (US); Gabriel Huau, Palo Alto, CA (US)

(73) Assignee: INNOPEAK TECHNOLOGY, INC., Palo Alto, CA (US)

( * ) Notice: Subject to any disclaimer, the term of this patent is extended or adjusted under 35 U.S.C. 154(b) by 267 days.

(21) Appl. No.: 18/372,411

(22) Filed: Sep. 25, 2023

(65) Prior Publication Data
US 2024/0082712 A1   Mar. 14, 2024

Related U.S. Application Data

(63) Continuation of application No. PCT/US2021/024459, filed on Mar. 26, 2021.

(51) Int. Cl.
| | |
|---|---|
| *A63F 13/52* | (2014.01) |
| *G06F 8/38* | (2018.01) |
| *G06F 9/54* | (2006.01) |
| *G06T 15/00* | (2011.01) |

(52) U.S. Cl.
CPC .............. *A63F 13/52* (2014.09); *G06F 8/38* (2013.01); *G06F 9/543* (2013.01); *G06T 15/005* (2013.01)

(58) Field of Classification Search
None
See application file for complete search history.

(56) References Cited

U.S. PATENT DOCUMENTS

| | | |
|---|---|---|
| 2002/0154214 A1 | 10/2002 | Scallie et al. |
| 2004/0073630 A1 | 4/2004 | Copeland et al. |
| 2006/0012604 A1* | 1/2006 | Seetharamaiah ....... G06T 15/04 345/426 |

(Continued)

OTHER PUBLICATIONS

WIPO, International Search Report for PCT Application No. PCT/US2021/024459, Jul. 8, 2021.

*Primary Examiner* — Andrew G Yang
(74) *Attorney, Agent, or Firm* — Sheppard, Mullin, Richter & Hampton LLP

(57) ABSTRACT

Provided are a method, a system and an electronic device for implementing flexible graphics enhancement and execution. For example, a flexible graphics enhancement and execution component can be an integrated element of a graphics application programming interface (API) that allows a visual effect of style to be added to the 3D graphics rendered from a mobile game. The techniques can include intercepting an initial function call, where the initial function call is associated with a graphics API rendering an image for an application. Then, a custom function can be automatically generated, based on the intercepted initial function call. A pointer associated with the generated custom function can be returned to the application, where the custom function modifies an output from the graphics API to add a visual effect to a three-dimensional (3D) rendered image of the application. The graphics API can be an Open Graphics Library (OpenGL) API.

20 Claims, 7 Drawing Sheets

(56) References Cited

U.S. PATENT DOCUMENTS

| | | | |
|---|---|---|---|
| 2008/0074415 A1* | 3/2008 | Woo | G06T 15/005 |
| | | | 345/419 |
| 2008/0143730 A1* | 6/2008 | Lindholm | G06T 1/20 |
| | | | 345/501 |
| 2010/0321382 A1* | 12/2010 | Amaratunga | H04N 9/12 |
| | | | 345/1.3 |
| 2011/0167243 A1 | 7/2011 | Yip et al. | |
| 2012/0291032 A1 | 11/2012 | Tzruya et al. | |
| 2012/0293519 A1* | 11/2012 | Ribble | G06T 1/20 |
| | | | 345/501 |
| 2015/0193904 A1* | 7/2015 | Vermeulen | G06T 1/20 |
| | | | 345/522 |
| 2015/0339137 A1 | 11/2015 | Andrus et al. | |
| 2019/0272184 A1 | 9/2019 | Rubenfield et al. | |
| 2020/0327772 A1* | 10/2020 | Babb | G06F 9/547 |
| 2022/0067876 A1* | 3/2022 | Kondguli | G06F 12/0877 |

\* cited by examiner

METHOD AND SYSTEM FOR FLEXIBLE GRAPHICS ENHANCEMENT AND EXECUTION

CROSS-REFERENCE OF RELATED APPLICATIONS

This application is a continuation of International Application No. PCT/US2021/024459 filed Mar. 26, 2021, which is hereby incorporated by reference in its entirety.

TECHNICAL FIELD

The present disclosure relates to the field of image processing, and in particular to a method and system for flexible graphics enhancement and execution, and an electronic device.

BACKGROUND

Mobile games are software games that are particularly designed for use on portable platforms, such as mobile devices including smartphones, pocket PCs, personal digital assistants (PDA), tablet PCs and portable media players. Some imaging technologies for mobile games are limited to two dimensional (2D) images. However more sophisticated mobile games are emerging that include the generation and transmission of three dimensional (3D) images and augmented reality technologies. In some cases, the backend platform responsible for generating the imaging often needs complete retooling. Existing platforms have trouble generating and storing these 3D images. Additionally, even when these improvements are made to the platform, limitations are insurmountable at the receiving device due to the resource constraints. These constraints manifest themselves in such features as small screen sizes, limited processing power, small memory footprints, and critical power consumption. Better systems are needed.

SUMMARY

In view of the above, embodiments of the present disclosure provide a method and system for flexible graphics enhancement and execution, and an electronic device.

In a first aspect, the embodiments of the present disclosure provide a method, and the method includes operations as follows. An initial function call is intercepted, where the initial function call is associated with a graphics application programming interface (API) rendering an image for an application. A custom function is generated automatically based on the intercepted initial function call. A pointer associated with the generated custom function is returned to the application, where the custom function modifies an output from the graphics API to add a visual effect to a three-dimensional (3D) rendered image of the application.

In a second aspect, the embodiments of the present disclosure provide a computer system for generating a three-dimensional (3D) rendered image. The computer system includes an application layer, a driver layer, and a graphics API layer. The application layer includes an application. The driver layer includes a graphics driver. The graphics API layer is provided between the application layer and the driver layer, where the graphics API layer includes a graphics API and a component configured to execute machine readable instructions to: intercept an initial function call from the application layer, where the initial function call is associated with a graphics API rendering an image for an application; automatically generate a custom function based on the intercepted initial function call; and return a pointer associated with the generated custom function to the application layer, where the custom function modifies an output from the graphics API to add a visual effect to the 3D rendered image of the application.

In a third aspect, the embodiments of the present disclosure provide an electronic device, and the electronic device includes one or more processors and a memory having instructions stored thereon. The instructions, when executed by the one or more processors, cause the one or more processors to: intercept an initial function call, where the initial function call is associated with a graphics API rendering an image for an application; automatically generate a custom function based on the intercepted initial function call; and return a pointer associated with the generated custom function to the application, where the custom function modifies an output from the graphics API to add a visual effect to a three-dimensional (3D) rendered image of the application.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

The present disclosure, in accordance with one or more various embodiments, is described in detail with reference to the following FIGURES. The FIGURES are provided for purposes of illustration only and merely depict typical or example embodiments.

Figure 1:
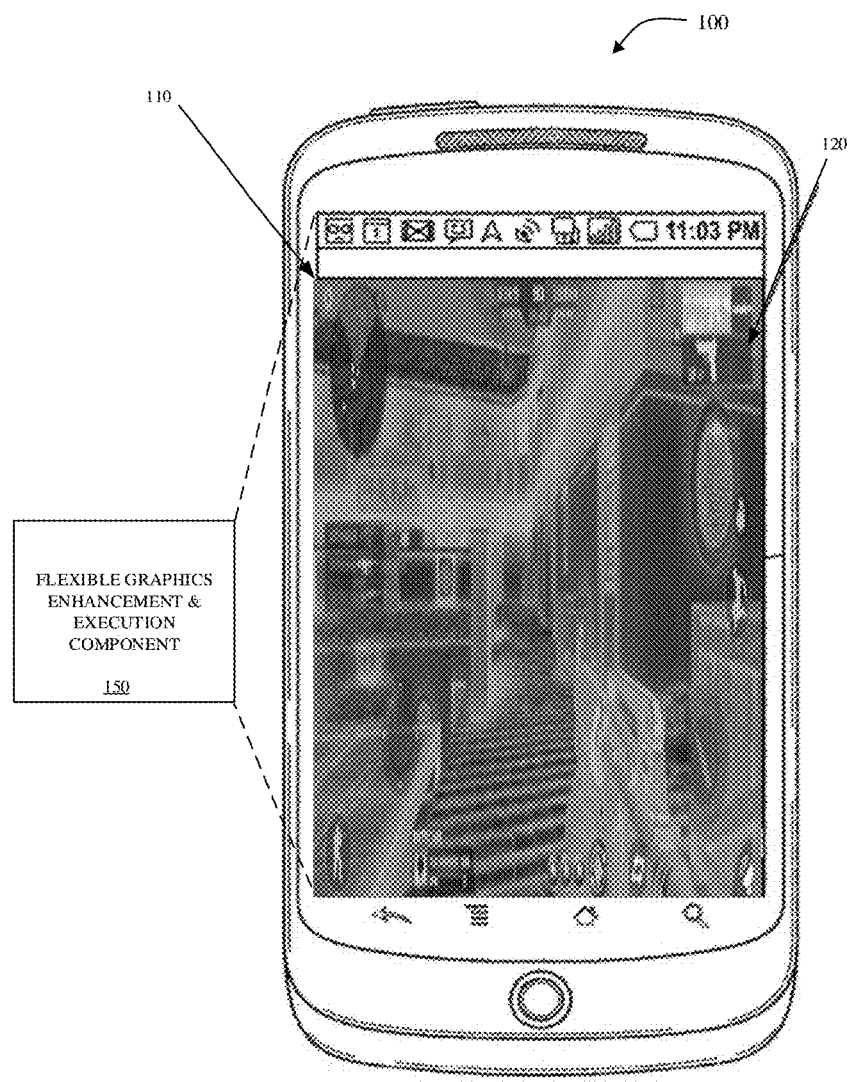
FIG. 1 depicts an example computing system, such as a mobile user device, implementing a graphics application program interface (API) including a flexible graphics enhancement and execution component, in accordance with embodiments of the disclosure.

The FIGURES are not exhaustive and do not limit the present disclosure to the precise form disclosed.

DETAILED DESCRIPTION OF PREFERRED EMBODIMENTS

Embodiments of the disclosure can provide flexible graphics enhancement and execution techniques and systems. As disclosed herein, the graphics enhancement and execution embodiments generate 3D images on a user device (e.g., mobile device, etc.) that are rendered as enhanced graphics of a software application, particularly in the realm of mobile games. For example, a flexible graphics enhancement and execution component can operate as an integrated element of a graphics application programming interface (API) that allows the user device to present a 3D effect to the graphics rendered from a mobile game that was not included in the original software application. This new 3D effect can improve the user experience and add functionality to the application in post-processing that was not originally provided by the software developer. The flexible graphics enhancement and execution component can be integrated into the graphics technology that is already utilized by some current and emerging next generation user devices, namely smartphones. As will be described further, the flexible graphics enhancement and execution component is designed to have a generic and flexible architecture, which allows it to serve as an enhancement that improves not only the visual user experience for gaming, but also improves the user device's performance (e.g., reducing the power consumption) across multiple platforms and mobile games.

Specifically in the gaming environment, as mobile devices have become increasingly more ubiquitous in the lives of users, mobile games have evolved drastically in step with the explosive demand for mobility. Thus, the gaming environment has grown beyond dedicated gaming consoles (interacting with stationary televisions, desktop computers, and the like) to include mobile games that can operate on the various mobile devices that permeate people's daily use, such as smartphone and tablet computers. As referred to herein, a mobile game can be considered a video game that is executed (and being played by a user) on a mobile device. Consequently, gaming has now emerged at the competition center for smartphone competitiveness, and even more so as mobile device technology continues to upgrade speed and connectivity capabilities, for instance smartphones including 5G network capabilities. Therefore, the overall user experience that revolves around playing a mobile game influences how users determine which phones provide the best quality video games and which video game applications to purchase from the marketplace. The overall user experience may include various factors such as a performance of the video game, a power consumption that occurs while playing the video game, heat released by the mobile device while playing the video game, audio quality of the video game, etc. Of these factors, the performance of the video game, which may refer to a frame rate of the video game, and a power consumption of the video game are the most significant factors that affect the overall user experience when playing a video game.

In some existing approaches to optimize mobile games, there are mobile 3D games that utilize an appropriate cross-platform 3D mobile game engine. The core functions of game engines, in general, include: 3D rendering graphics; physics engine; Artificial Intelligence (AI); and memory management. Traditionally, the game engines are more generically optimized for mobile platforms but not necessary for a specific mobile device, for example a particular brand/model of smartphone or System-on-Chip (SoC). As another approach, an Original Equipment Manufacturer (OEM) can attempt to improve the game performance by increasing the resources available on the device itself, such as the Central Processing Unit (CPU), Graphics Processing Unit (GPU), or RAM frequencies. However, there are various design tradeoffs that are associated with using this brute force approach (e.g., improving gaming performance by increasing the processing resources). For instance, increasing the processing speed of a smartphone's GPU may improve the overall performance of mobile gaming on the device (e.g., enhanced graphics rendering). Nonetheless, boosting the GPU can also lead to the drawback of significantly higher power consumption while the user is running a mobile game. Due to such extra power consumption, playing a mobile game may substantively drain the smartphone's battery life much faster than desirable.

As disclosed herein, the flexible graphics enhancement and execution component and techniques provide an improvement over the aforementioned approaches, for example by mitigating extra power consumption. That is, the flexible graphics enhancement and execution component has a distinct design that balances boosting performances and maintaining lower power consumption on the mobile device. Generally, the flexible graphics enhancement and execution component is integrated with a graphics API in order to reorganize and optimize the graphics command stream in a manner that enhances 3D graphics rendering, and improves performance for both the mobile game and the mobile device (e.g., smartphone).

Moreover, although mobile gaming has improved by leaps and bounds, the mobile devices on which the mobile games are executed are still constrained by small screen sizes, limited processing power, small memory footprints, and critical power consumption. Many of the games delivered on the mobile platforms have been restricted to 2D games, 3D-look-like games (i.e. not true 3D), or games with very poor 3D effects. This is simply because implementing fully 3D-featured mobile games on user devices has never been an easy task. In fact, advanced 3D graphics techniques are widespread in the games market (PC and console) but true 3D in mobile games is limited. For example, standard 3D image warping for rendering true 3D graphics is based on a specific platform for a specific data format. It could be overwhelming for a software developer to add old functionalities from old platforms to the new 3D enabled platform for each of the various mobile games, since the developers would also need to generate new applications and functions to support the game engine. Therefore, the solution for cross game engine development has been a difficult problem to solve. Other issues in the 3D rendering process involve how to improve the user experience. As previously described, embodiments of the present disclosure include the flexible graphics enhancement and execution component and techniques that address the general constrains of mobile devices, while providing a significantly enhanced 3D graphics rendering experience for mobile gaming.

Referring now to FIG. 1, an example of a computing system 100 implementing the disclosed flexible graphics enhancement and execution component 150 is shown. In this illustration, the computing system 100 is depicted as a handheld mobile user device, namely a smartphone (e.g., application telephone) that includes a touchscreen display device 110 for presenting content to a user of the computing system 100 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard, physical buttons, trackballs, accelerometers, gyroscopes, and magnetometers).

Example visual output mechanism in the form of display device 110 may take the form of a display with resistive or capacitive touch capabilities. The display device 110 may be for displaying video, graphics, images, and text, and for coordinating user touch input locations with the location of displayed information so that the device 110 can associate user contact at a location of a displayed item with the item. The computing system 100 may also take alternative forms, including as a laptop computer, a tablet or slate computer, a personal digital assistant (PDA), an embedded system (e.g., a car navigation system), a desktop personal computer, or a computerized workstation.

An operating system may provide an interface between the hardware of the computing system 100 (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS—a variety of UNIX operating systems; or a proprietary operating system for computerized devices. The operating system may provide a platform for the execution of application programs, such as mobile games, that facilitate interaction between the computing system 100 and a user.

The computing system 100 may present a graphical user interface (GUI) with the display device 110 (e.g., touchscreen). As referred to herein, a GUI is a collection of one or more graphical interface elements and may be static (e.g., the display appears to remain the same over a period of time), or may be dynamic (e.g., the graphical user interface includes graphical interface elements that animate without user input). As illustrated in FIG. 1, the GUI can render an image 120 as output from a mobile game executing on the computing system 100. In other words, a user can employ the computing system 100 to play a mobile game, where the mobile game includes 3D graphics that are displayed on display device 110 (via the GUI) in a manner that is visible and interactive for the user.

According to the embodiments, the flexible graphics enhancement and execution component 150 is particularly designed to enhance the 3D graphics rendering of a software application, such as the mobile game that is being displayed on display device 110. For example, the flexible graphics enhancement and execution component 150 is configured to generate image 120 as a high quality 3D graphic rendering from the mobile game. Additionally, the flexible graphics enhancement and execution component 150 has the capability to add multiple visual effects and styles on top of an original image of the game rendering, as a further enhancement to the graphics and gaming experience for the user. In FIG. 1, image 120 is particularly illustrated as an inverted image (of an original game rendering). The image 120 can be inverted as a visual effect that is added to the graphics of the mobile game by the flexible graphics enhancement and execution component 150, which results in image 120 being a composite of the reverse of the colors in the original image (e.g., red color reversed to cyan, green reversed to magenta, blue reversed to yellow, etc.). The inverted image 120 in the illustration is merely an example for purposes of discussion, and not intended to be limiting. According to the embodiments, the flexible graphics enhancement and execution component 150 can implement various forms of filters, visual effects (e.g., applying post-processing effects), and styles that can enhance the 3D graphics rendering of the mobile game, in order to make the aesthetics, visibility, or overall experience of the mobile game more enjoyable (or improved) for the user.

Additionally, a key aspect of the flexible graphics enhancement and execution component 150 is that the graphics enhancements and performance improvements are provided in a manner that solves the power consumption issues that are associated with some current optimization approaches. Particularly, the flexible graphics enhancement and execution component 150 is implemented to realize the aforementioned improvements, while reducing the power consumption. As an example, the flexible graphics enhancement and execution component 150 may be configured to deliver high performances while reducing the power consumption by as much as 20%.

This can be achieved as a result of the distinct architecture and function of the flexible graphics enhancement and execution component 150. Greater details regarding the architecture of the flexible graphics enhancement and execution component 150 are discussed with respect to FIG. 2. In general, the flexible graphics enhancement and execution component 150 can be added as an interception layer between an application layer (e.g., OS) and a graphics driver. This supports a framework where a third party, like an OEM, can customize calls intercepted by the flexible graphics enhancement and execution component 150 in order to improve performances, reduce power consumption, and add the aforementioned graphics effects features to the mobile game. In the embodiments, the flexible graphics enhancement and execution component 150 is integrated within a graphics API of the computing system 100. By implementing the flexible graphics enhancement and execution component 150 as a layer below the application/framework layer, the flexible graphics enhancement and execution component 150 is not specific to the software application, and thus can be used as a generic solution that is applied to various software applications and mobile games. Furthermore, by implementing the flexible graphics enhancement and execution component 150 as a layer above the graphics driver, the flexible graphics enhancement and execution component 150 is hardware independent, and thus can enhance gaming performances across multiple platforms and mobile user devices.

Figure 2:
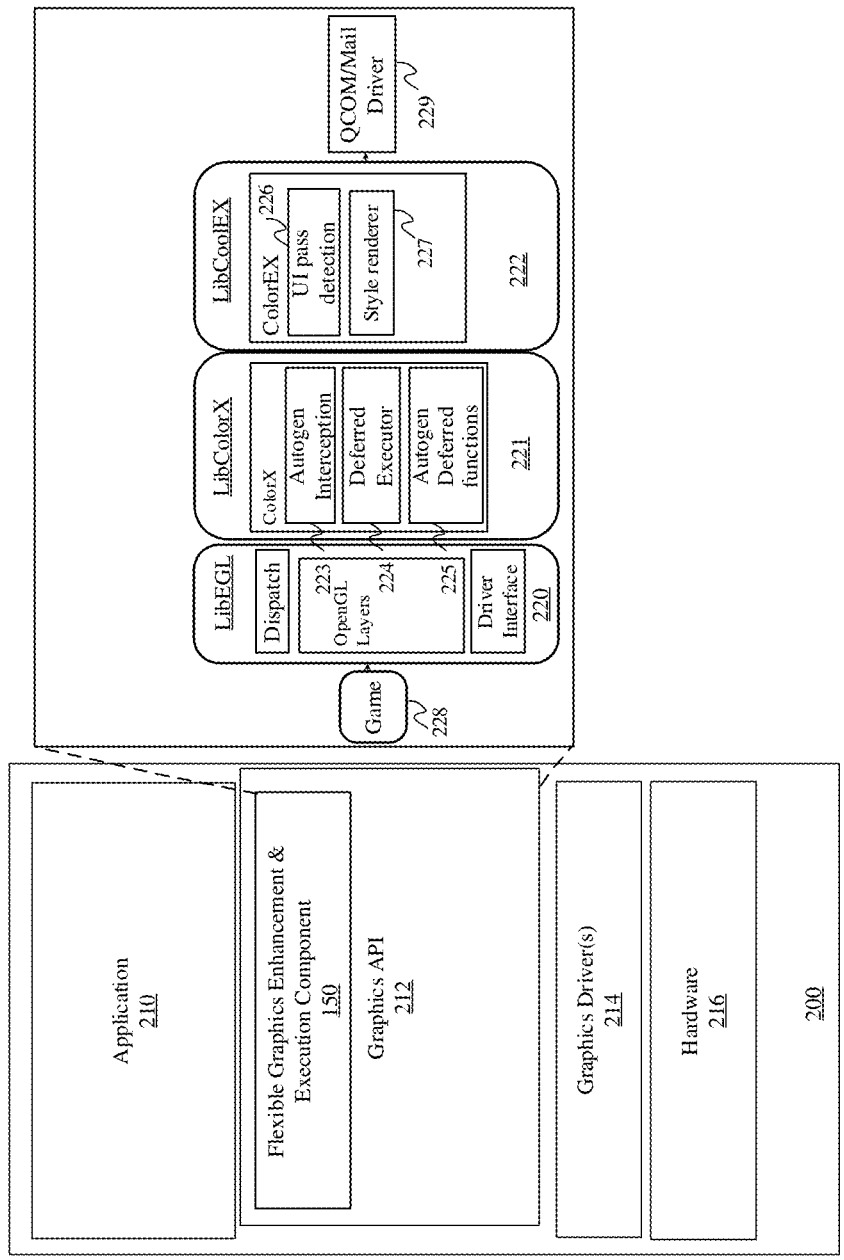
FIG. 2 illustrates an example architecture of a computing system, such as a mobile user device shown in FIG. 1 implementing flexible graphics enhancement and execution, in accordance with embodiments of the disclosure.

In FIG. 2, an example architecture of the computing system 200 (shown in FIG. 1) implementing the flexible graphics enhancement and execution component 150 is depicted. In particular, FIG. 2 shows the layers 210, 212, 214, and 216 (e.g., hardware and software elements of the system 200) that the computer system 200 may utilize while executing a mobile game. As shown in FIG. 2, the computing system 200 includes: a hardware layer 216; a graphics driver layer 214; a graphics API layer 212 having the flexible graphics enhancement and execution component 150 integrated therein; and an application layer 210. For example, a graphics command may be passed, starting at the application layer 210, down through each of the layers 212-214 until reaching the hardware layer 216 to be executed. In detail, FIG. 2 illustrates that the flexible graphics enhancement and execution component 150 is implemented as an interception layer that is between the application layer 210 (e.g., above the flexible graphics enhancement and execution component 150) and the graphics driver(s) 214 (e.g., below the flexible graphics enhancement and execution component 150).

The hardware layer 216 may include various memory, processing, and other hardware resources that are used by computing system 200. For example, the hardware layer 216 can include: a central processing unit (CPU); a graphics processing unit (GPU), where the GPU can include its own dedicated memory to speed up graphics rendering, a double data rate (DDR); and a system on chip (SOC). The embodiments of flexible graphics enhancement and execution disclosed herein may be implemented by hardware in the hardware layer 216.

Next, on top of the hardware layer 216, is the graphic driver layer 214. The graphics driver layer 214 can include software written for the OS executing at the computing device 200 that is used to communicate with the components at the hardware layer 216. Particularly, the graphics driver of layer 214 may be implemented as an Open Graphics Library (OpenGL) driver, in some embodiments.

Next is the graphics API layer 212. The graphics API layer 212 can include a graphics API that is employed to display graphics. In some embodiments, the graphics API of layer 212 is implemented as Open Graphics Library (Open GL). Open GL is a cross-language, cross-platform industry standard API that is configured for rendering 2D and 3D vector graphics, such as the 3D graphics displayed while playing a mobile game. Open GL API is typically used to interact with the GPU, to achieve hardware-accelerated rendering. In other words, OpenGL graphic rendering commands issued by an application, such as a mobile game, could be directed to the graphic hardware (e.g., GPU) and accelerated. In some embodiments, the graphics API layer 212 can be integrated with many different game engines to create a 3D view for various user device models, thus removing the need for image generators at the user device to create 3D images. The 3D images can be created for viewing by the end user and seemingly incorporated with the game or other software application. Further, the graphics API layer 212 can be integrated with the flexible graphics enhancement and execution component 150. This architecture can support various different applications and mobile games (e.g., generic/not software application specific), by implementing the flexible graphics enhancement and execution component 150 below the application layer 210. Further, this architecture enables hardware independence (e.g., generic/not hardware specific), by implementing the flexible graphics enhancement and execution component 150 above the graphics driver layer 214.

The application layer 210 can include various applications, such as the mobile game, and the device framework. The application layer 210 can also include data that is related to a particular mobile game, such as accounts, simulation/artificial intelligence (AI), level design, and assets/resources.

Referring back to the graphics API layer 212, FIG. 2 also illustrates further details regarding integrating the flexible graphics enhancement and execution component 150 with the elements of the layer 212. For instance, FIG. 2 shows the graphics API layer 212 with the disclosed flexible graphics enhancement and execution component 150 includes three components: 1) Embedded-System Graphics Library (EGL) library 220; 2) ColorX Library 221; and 3) CoolEX 222 Library. The EGL library 220 implements an interface between graphics rendering APIs (such as OpenGL) and the underlying native platform window system. EGL library 220 can handle graphics context management, surface/buffer binding, and rendering synchronization and enables high-performance, accelerated, mixed-mode 2D and 3D rendering using other graphics APIs. The main EGL library 220 (libEGL) is window system neutral, and provides the EGL API entry points and helper functions for use by the drivers. Drivers are dynamically loaded by the EGL library 220 and some of the EGL API calls are directly dispatched to the drivers. The CoolEX library 222 is an optional library that employs the framework of the flexible graphics enhancement and execution 150 to achieve additional graphics functionality.

According to the embodiments, the flexible graphics enhancement and execution component 150 is configured to intercept calls. In the example, a graphics command stream can travel a path between a mobile game 228 and a driver 229. Calls (related to the graphics command stream) can be intercepted by the flexible graphics enhancement and execution component 150 in this path. The intercepted calls can then be deferred by the flexible graphics enhancement and execution component 150 in a manner that allows the commands to be modified, ultimately adding features to the rendered graphics of the game 228. The flexible graphics enhancement and execution component 150 is also configured to expose a framework for other libraries in the architecture, such as the CoolEX library 222, in order to add custom code to enhance or modify the graphics command stream. Further, the flexible graphics enhancement and execution component 150 is implemented to be decoupled from framework, namely the main EGL library 220 (libEGL). Because the GPU hardware structure of each graphics card manufacturer is different, the EGL library 220 can also be different for different manufacturer. FIG. 2 shows that the implementation includes a minimal modification in the EGL library 220. By decoupling the code/functions of the flexible graphics enhancement and execution component 150 from the EGL library 220, its implementation is advantageously allowed to remain generic and easy to maintain (e.g., does not have to modified for different EGL libraries that may be deployed).

FIG. 2 shows that the code/functions of the flexible graphics enhancement and execution component 150 has a distributed integration amongst the various libraries 220-222. As seen, the Color X library (libColorX) 221 includes an automatically generated (auto-generated) interception 223, a deferred executor 224, and automatically generated deferred functions 225 which enables generic and automatically generated interception functions that can cache virtually any OpenGL API. The CoolEx library (libCoolEX) 222 includes a UI pass detection 226, and a style renderer 227 that implement the various features of the flexible graphics enhancement and execution component 150. The flexible graphics enhancement and execution component 150 also has a framework which enables external library to register which APIs that they interact with. Generally, the flexible graphics enhancement and execution component's 150 functionality can be considered to include three principal elements: 1) interception; 2) deferring, and 3) framework. Details regarding each of these elements are described further throughout the disclosure in reference to FIG. 3-FIG. 6.

Figure 3A:
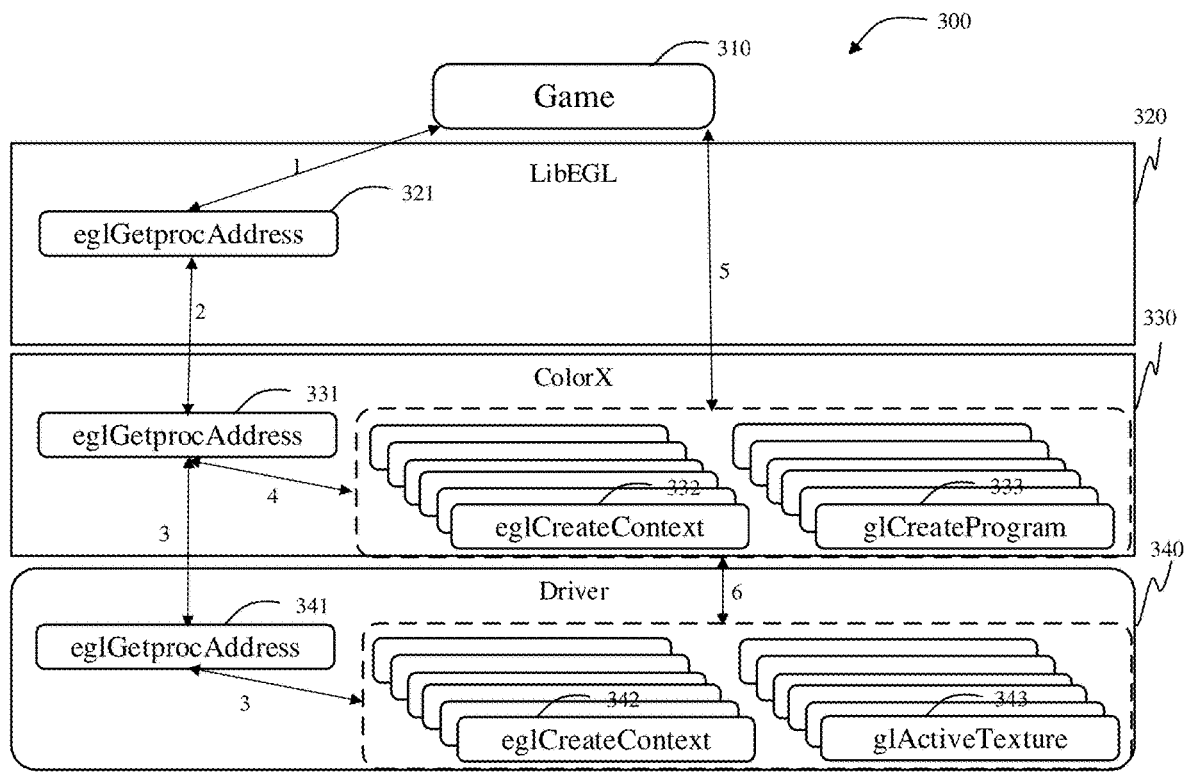
FIG. 3A illustrates an example flow of a graphics API call applying the flexible graphics enhancement and execution method during interception, in accordance with embodiments of the disclosure.

Now referring to FIG. 3A, an example of the interception aspects of the flexible graphics enhancement and execution component's 150 functionality is illustrated. In this example, an architecture 300 in which the graphics command stream can travel during execution includes a top layer of a mobile game 310, a libEGL layer 320 including the main library (libEGL) beneath the mobile game 310, a subsequent ColorX layer 330 including the ColorX library, and the bottom driver layer 340 including the driver. According to the embodiments, interception is implemented in the libEGL layer 320, that sits on top of the driver layer 340.

Figure 3B:
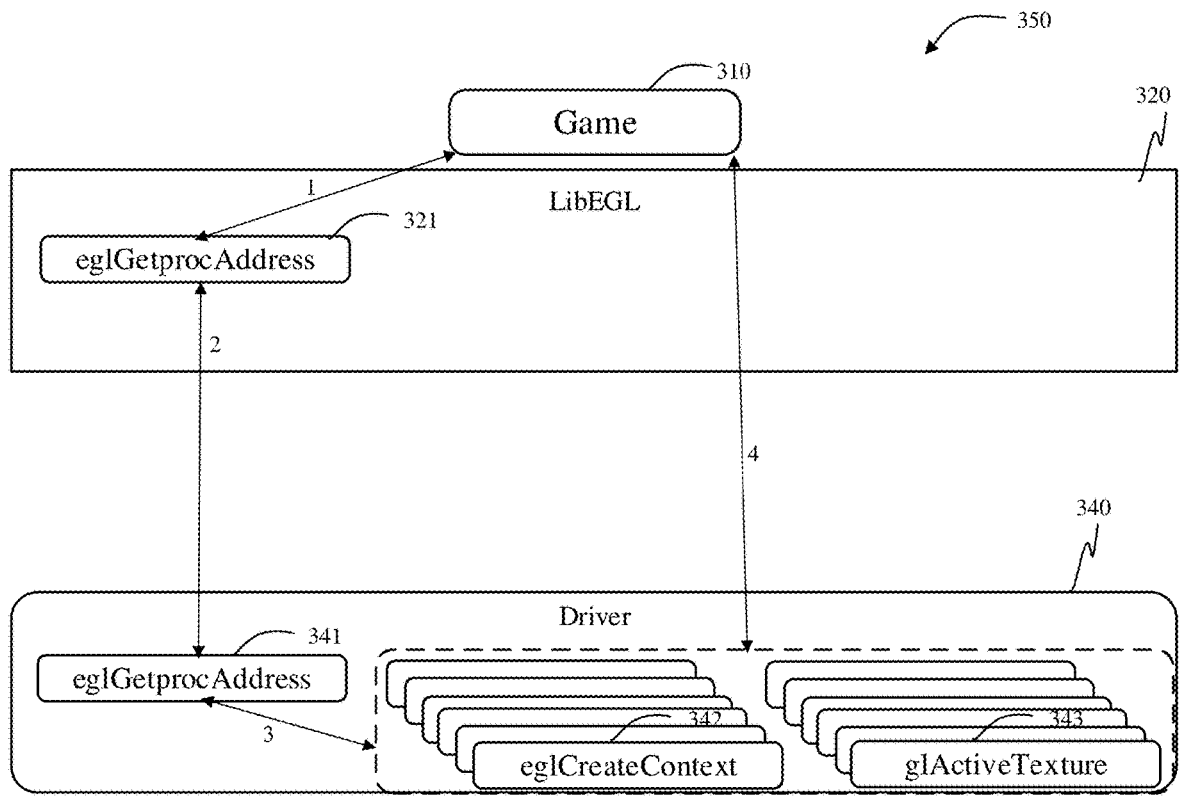
FIG. 3B illustrates another example flow of a graphics API call applying the flexible graphics enhancement and execution method during pass-thru, in accordance with embodiments of the disclosure.

In the example of FIG. 3A, libEGL at the libEGL layer 320 calls an initial function 321. This initial function 321 is shown as a ColorX function, namely a "eglGetProcAddress( )" function. Thereafter, the initial function 321, namely the "eglGetProcAddress( )" function, determines whether the function is to be intercepted (e.g., returning a ColorX function pointer) or not intercepted (e.g., calling and returning a result for "eglGetProcAddress( )" from the driver layer). FIG. 3A shows the example flow of the graphics command stream in the case where the function is intercepted. Conversely, FIG. 3B illustrates an example flow of the command stream in the case where the function is not intercepted, also referred to herein as pass-thru.

Referring back to FIG. 3A, when interception occurs in the libEGL layer 320, the initial function 321 is intercepted such that a ColorX function pointer is returned. As alluded to above, the libEGL layer 320 is distinctly configured to perform function interception, thereby supporting the "interception" aspects of the flexible graphics enhancements and execution component's functionality.

Thus, as result of interception, FIG. 3A shows that at the ColorX layer 330 the function 331, namely the "eglGetProcAddress( )" function can return a pointer from the one or more custom functions implemented at the ColorX layer 330 (rather than a pointer from the driver) In the embodiments, the "eglGetProcAddress( )" is a special command which returns the pointer to a function. FIG. 3A illustrates that the function 331 can point to these other custom functions that are implemented at the ColorX layer 330. In the illustrated example, the custom functions at the ColorX layer 330 can include functions such as "eglCreateContext" function 332 and a "glCreateProgram" function 333 that are implemented as elements of the flexible graphics enhancements and execution component, and employed to control the graphics rending of the game 310 by the corresponding graphics API. It should be appreciated that the functions 332, 333 at the ColorX layer 330, as shown in FIG. 3A, are merely examples of custom functions and are not intended to be limiting. Thus, other custom functions may be implemented at the ColorX layer 330 which are not shown in FIG. 3A. Subsequently, as the "eglGetProcAddress( )" function returns a custom function pointer from the ColorX layer 330, the game 310 can call directly to one of these functions implemented by the flexible graphics enhancements and execution component (also referred to herein as custom functions) at the ColorX layer 330, such as functions 332 and 333.

Then, the flexible graphics enhancements and execution component can call driver implementation. In the illustrated example, the functions 332, 333 at the ColorX layer 330 can call functions 342, 343 implemented at the driver layer 340. In FIG. 3A, examples of these driver implementations are illustrated as an "eglCreateContext" function 342, and an "glActiveTexture" function 343. According to the embodiments, the flexible graphics enhancements and execution component can generate its functions automatically, which allows the component to be able to catch and optimize most of the functions for the graphics driver, such as openGL functions. The flexible graphics enhancements and execution component, by intercepting nearly all functions, can implement different execution modes. The flexible graphics enhancements and execution component is configured to include at least three execution modes, including: 1) Immediate: execute the call directly; 2) Deferred: cache call to be executed later, in batch; and 3) Hybrid: cache call to be executed in a different thread. As a result, the flexible graphics enhancements and execution component realizes an increased flexibility, having the ability selectively execute in one of the execution modes that is deemed most optimal, depending on the particular operational environment (e.g., game, framework, application). In some embodiments, scripts (e.g., python script) and a list of OpenGL APIs are employed pre-compilation in order to achieve the automatic generation of functions by the flexible graphics enhancements and execution component.

As previously mentioned, FIG. 3B particularly illustrates the command stream in the case where the function is not intercepted also referred to as pass-thru. As shown in FIG. 3B, when the function 331 is not intercepted, the game 310 (or framework) can call the initial function 321, namely "eglGetProcAddress( )" in order to get the pointer to the function that is intended to be called. LibEGL can go straight from the ligEGL layer 320 to the driver 340 (rather than being intercepted at the libEGL layer as shown in FIG. 3A) to find the proper pointer to return to the game 310. Thereafter, the game 310 can call this previously returned pointer from the driver 340.

Figure 4:
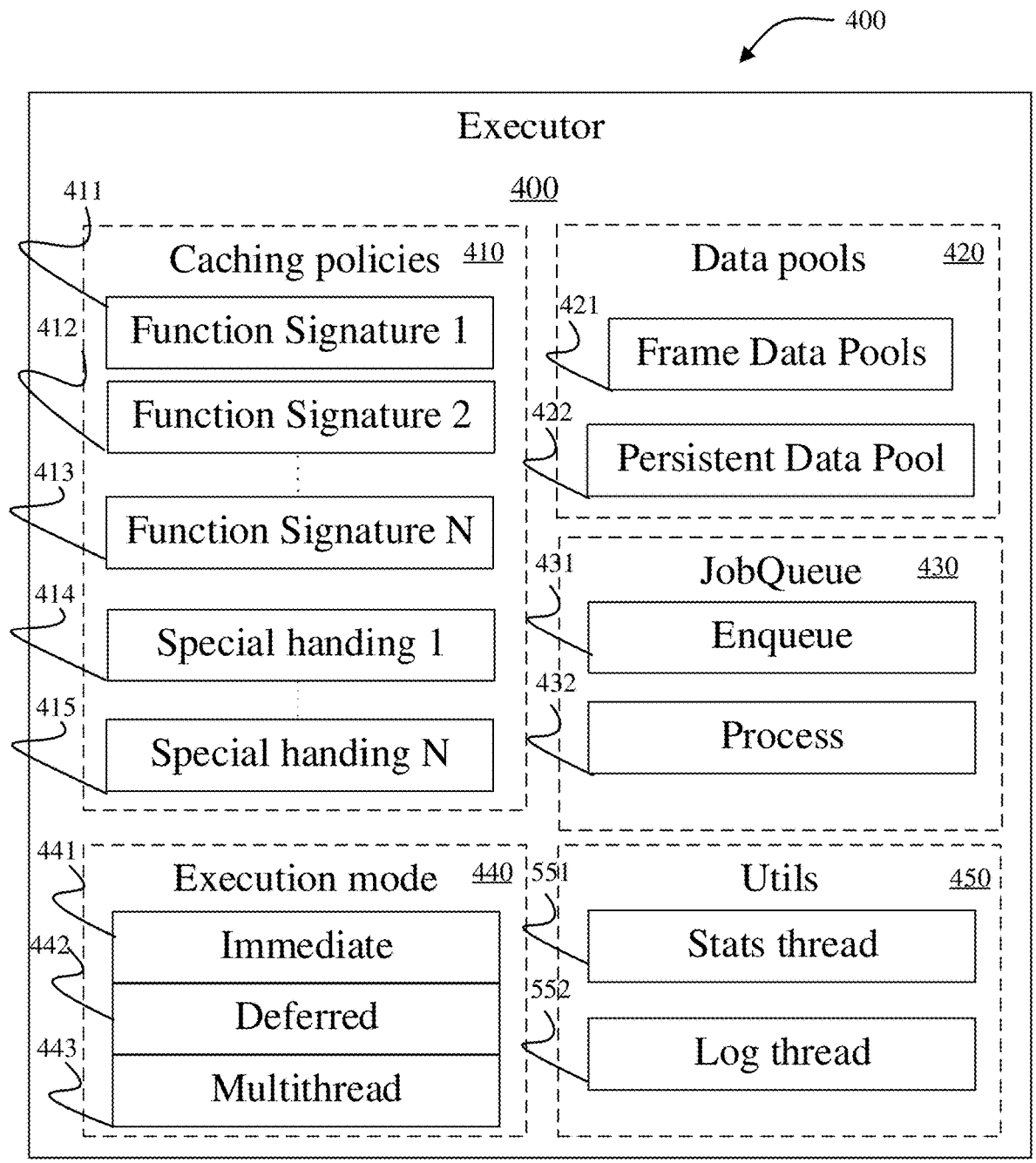
FIG. 4 illustrates an example architecture of an executor of the flexible graphics enhancement and execution component, in accordance with embodiments of the disclosure.

Referring now to FIG. 4, an example configuration of an executor 400 is shown. The executor 400 is a core element of the flexible graphics enhancement and execution component, as disclosed herein. The executor 400 can be implemented using software, hardware, or a combination thereof as an element of the flexible graphics enhancement and execution component within a computer system executing a mobile game, for instance. The executor 400 is configured to execute calls of the graphics API, such as OpenGL calls. Significantly, the executor 400 executes these calls according to the execution modes of the flexible graphics enhancements and execution component, and caching policies. In the embodiments, there is one executor 400 per Open GL context in order to handle multi-context cases. That is, the executor 400 is particularly configured to apply at least one of an immediate, deferred, or hybrid mode when executing a call. Consequently, it is the executor 400 that implements many of the key aspects of the flexible graphics enhancements and execution component's functionality.

Particularly in FIG. 4, the executor 400 is shown to include caching policies 410. It is common for OpenGL APIs to have a similar signature, meaning the return value and parameters of the functions for the APIs are similar. Therefore, the techniques and mechanisms that are used to cache and handle the functions can also be similar. The executor 410 is configured to detect the signature of the graphics API, such as OpenGL API, and determine the appropriate caching policy 410 to apply. This enables the executor to virtually supports all OpenGL API in a small number of caching policies. In addition to generic caching policies, it is possible to implement one or more specific caching policies that correspond to a specific OpenGL API, for example. In the illustrated example of FIG. 4, the caching policies 410 includes multiple function signatures, shown as function signature "1" 411, function signature "2" 412, function signature "n" 413. Additionally, the caching policies 410 includes one or more special handling instructions, shown as special handling "1" 414, and special handling "2" 415.

Further, the executor 400 is shown to include data pools 420. In order to reduce the number of memory allocation during the caching process, the executor 400 is configured to implement two types of memory pools: 1) frame data pools 421 for storing and/or caching per-frame data; 2) persistent data pool 422 storing and/or caching persistent data. Per-frame data, which can be cached in the frame data pools 421 is the data which is no longer valid after the end of the frame. Per-frame data can often be recycled. Persistent data, which can be cached in the persistent data pools 422, is the data which needs to be kept in cache for multiple frames, at least. By leveraging these data pools 420 as buffers, the executor 400 can achieve more efficient memory management and therefore, save power. Furthermore, using per-frame data cached in the frame data pools 421 allows visit of historical data, which can be used during optimizations.

FIG. 4 also shows the executor 400 including a job queue 430, and execution mode 440. The various execution modes of the flexible graphics enhancement and execution component, which are implemented by the instruction of execution mode 440 have been previously described. In the example, the execution mode 440 of the executor 400 is illustrated to include one or more modes, namely immediate mode 441, deferred mode 442, or multithread mode 443. The job queue 430 is shown to include an enqueue 431 and process 432. The job queue 430 can receive the cached commands from the caching policies 410 and, depending of the execution mode, the command may be executed immediately or delayed. For example, in operation, each OpenGL API call will be meet with a caching policy 410 and then executed by the Job Queue 430. This example operation of the executor is illustrated in FIG. 5.

Figure 5:
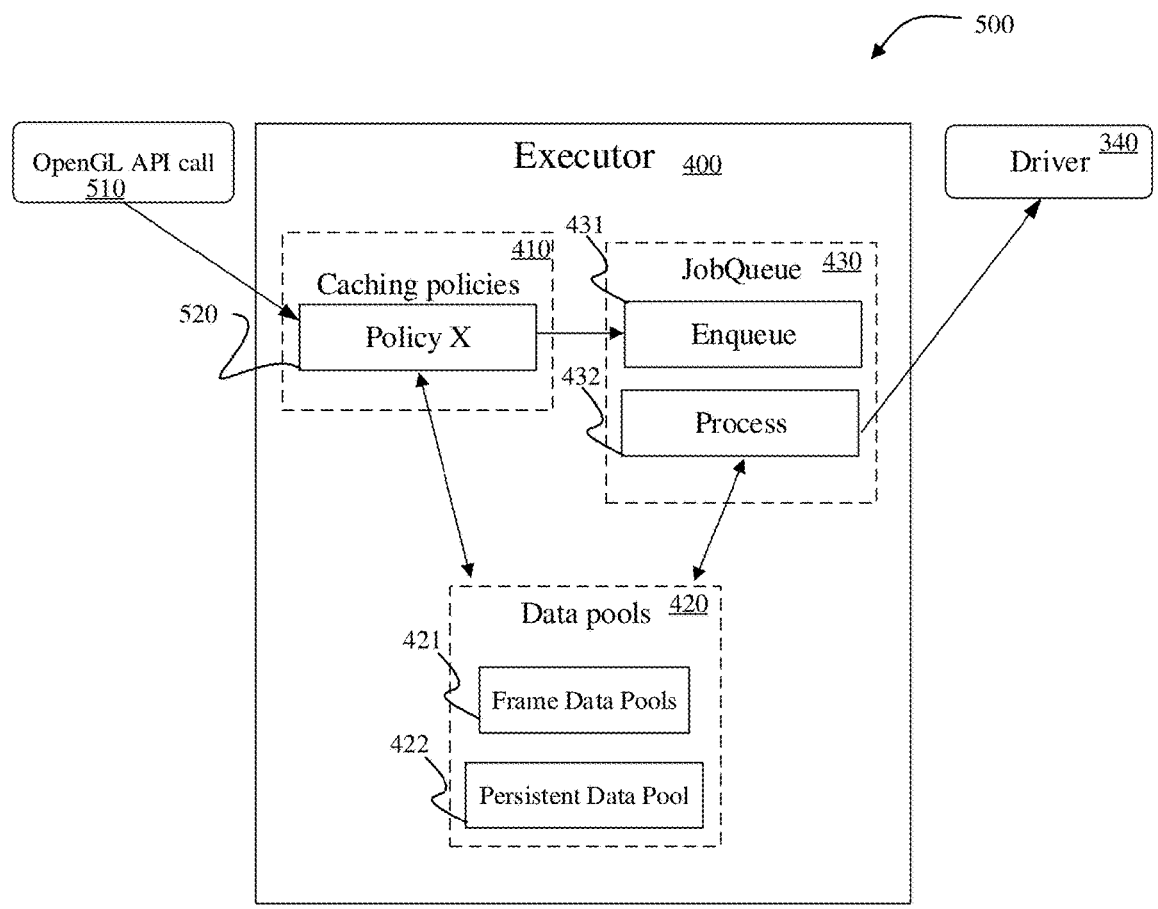
FIG. 5 illustrates an example of the executor of the flexible graphics enhancement and execution component shown in FIG. 4 handling a graphics API call, in accordance with embodiments of the disclosure.

In the example operation shown in FIG. 5, the executor 400 receives an OpenGL API call 510. In response, the executor 400 can select an appropriate caching policy for this OpenGL API call 510 from the caching policies 410. The example illustrates the executor 400 specifically selecting "policy X" 520 to be applied to the received OpenGL API call 510. For example, the executor 400 may be configured to particularly apply "policy X" 520 each time for OpenGL API call 510. In other words, "policy X" 520 may be specifically designed for use with OpenGL API call 510. Alternatively, "policy X" 520 may be a generic policy that is applied for a call based on the particular operational conditions (e.g., game, framework, application).

Subsequent, the OpenGL API call 510 can be executed by the job queue 430 based on the applied policy, namely "policy X" 520. FIG. 5 also illustrates that the caching policy 410 and job queue 430 can receive from and/or transmit data to the data pools 420. For instance, as the job queue 430 is executing the OpenGL API call 510, any persistent data generated during execution can be communicated to the data pools 420, allowing the persistent data to be stored for subsequent frames. FIG. 5 shows that the executor 400 can ultimately call an implementation at the driver 340, where the driver 340 will process the command and may return some data, if expected by the OpenGL API call. For example, a "glBindBuffer" function can be processed by the driver 340 but no data is expected in return. Thus, in this example, the driver will not return any data, as none is expected.

Referring back to FIG. 4, in cases where the executor 400 encounters a function that needs to be executed right away, the executor 400 may determine it most optimal to execute that function in the immediate mode 441. In the case where a function needs to be intercepted, the executor 400 may determine it most optimal to execute that function in the deferred mode 442, such that the command may be delayed to be executed later at a certain time. In the multithread mode 443 (also referred to as hybrid mode), the command may be delayed and will be executed in a separate thread. The multithread mode 443 enables the disclosed flexible graphics enhancement and execution component to perform offloading of some work away from the application rendering thread. Consequently, by leveraging offloading, the flexible graphics enhancement and execution component can realize additional optimization advantages, such as performance gain.

Additionally, the executor 400 includes utilities 450 in the illustrated configuration. Utilities 450 can be an object that collects data and debugs information to better improve the operation and performance of the executor 400.

Figure 6:
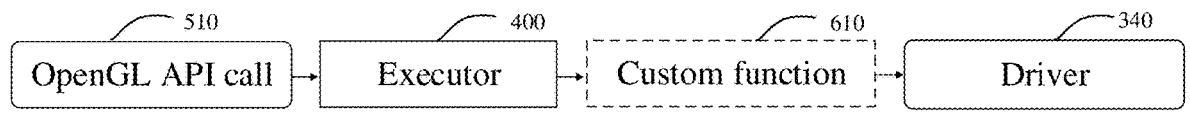
FIG. 6 illustrates an example framework implementing the flexible graphics enhancement and execution component, in accordance with embodiments of the disclosure.

FIG. 6 shows an example framework 600 for the flexible graphics enhancement and execution component, as disclosed here. According to the embodiments, the framework 600 can hook the OpenGL API call 510 in order to provide additional visual effects and optimization for mobile games and other applications.

FIG. 6 shows that the framework 600 includes an OpenGL API call 510, executor 400, custom function 610, and driver 340. In operation, the OpenGL API call 510 can received by executor 400 and the custom function 610 of the framework. As previously described, the executor 400 and custom function 610 can be implemented as key elements of the flexible graphics and enhancement and execution component. An external library can register a custom function 610 to be called when the executor 400 encounters a specific OpenGL API 510. As the framework 600 is implement in an integrated manner, the framework 600 is compatible with the different execution modes that can be used by the executor 400. In addition, the framework 600 is distinctly implemented to replace the pointer pointing to the driver 340 with the pointer pointing to the custom function 610, so there is no associated overhead (e.g., additional mechanisms needed for redirecting back to the custom function 610 from the driver 340). According to the embodiments, the custom API calls (shown as customer function 610) can be implemented on a per-application basis. This flexibility allows the technology to be customize differently for each application which uses graphics API that are compatible with the framework 600, such as OpenGL APIs.

As disclosed herein, the flexible graphics enhancement and execution techniques and system provides a technical solution, that is generic with respect to being usable with various graphics APIs and applications, and achieving hardware-independence. For instance, the framework 600 and functionality is distinctly configured to virtually supports a vast array of graphics APIs that may be employed in computer device, namely OpenGL APIs. For example, as alluded to above, the flexible graphics enhancement and execution techniques can employ a signature as a generic mechanism for handle caching and execution. Furthermore, the functions utilized for implementing the disclosed interception capabilities are generated automatically, increasing the optimization and having low overhead. Moreover, the disclosed flexible graphics enhancement and execution techniques and system can achieve great flexibility, enabling different execution modes, that can be optimized for different mobile games and applications. As another advantage, the flexible graphics enhancement and execution techniques and system supports customization. For example, a key feature of the technology are custom functions that can be flexible graphics enhancement and execution component. These custom functions are designed to provide custom functionality, such as styles and effects that can be added to a 3D graphics rendering of a game, and can be further customized to be called when an application is calling a specific OpenGL API.

Even further, the flexible graphics enhancement and execution techniques and system is able to achieve power saving. As described herein, the technology can cache data efficiently, having an architecture that includes multiple caching mechanisms, such as a frame data pool and persistent data pool. Also, the flexible graphics enhancement and execution techniques and system has the capability to defer a call, which allows OpenGL calls to be delayed and executed in another thread (e.g., overlapping with the game render thread). Due to this multithreading, the flexible graphics enhancement and execution techniques and system can effectively cause the CPU or GPU to operate more efficiently, and thereby improve performance.

Figure 7:
FIG. 7 illustrates an example of an original image of a game rendering and an example of an enhanced image of the game rending applying a style effect implemented by the flexible graphics enhancement and execution component, in accordance with embodiments of the disclosure.
Figure 7:
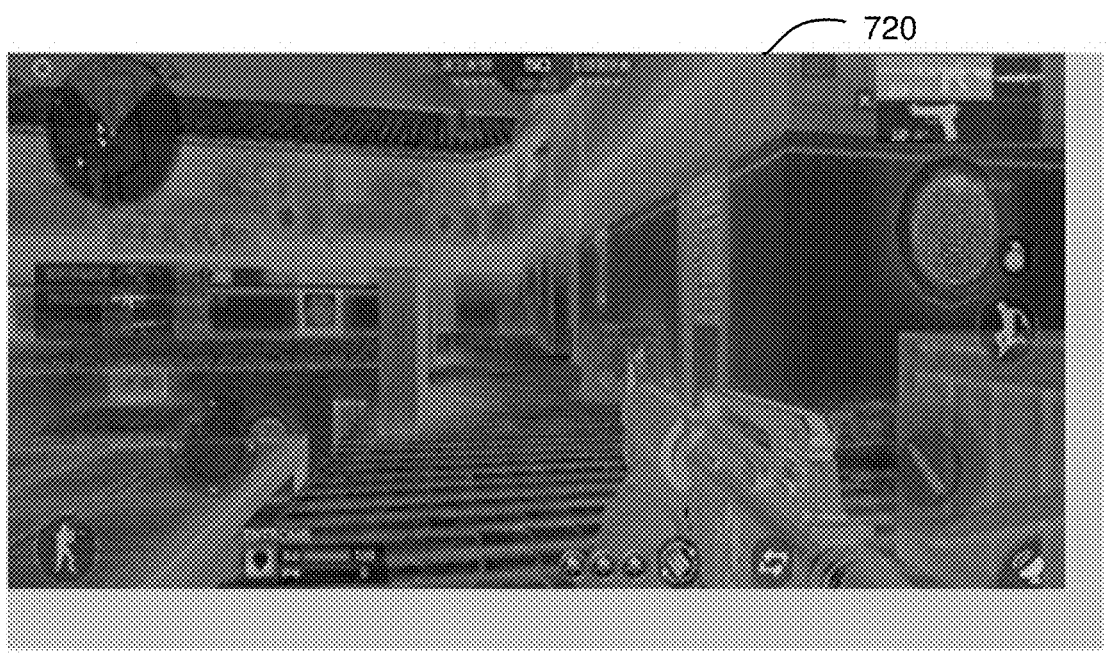

FIG. 7 illustrate various images associated with features of the flexible graphics enhancement and execution techniques and system, in accordance with embodiments of the disclosure.

FIG. 7 illustrates an original image 710, in accordance with embodiments of the disclosure. The original image 700 may be generated by the game engine and displayed in the rendering of a mobile game that is unaltered by flexible graphics enhancement and execution component. FIG. 7 also shows an example of an enhanced image 720 of the game rending applying a style effect implemented by the flexible graphics enhancement and execution component, in accordance with embodiments of the disclosure. For example, the enhanced image 720 can be a high quality 3D graphic rendering from a mobile game, having a visual effects and styles added on top of an original image 710 of the game rendering. In FIG. 7, enhanced image 720 is an inverted image of the original image 710. The image 710 can be inverted as a visual effect that is added to the graphics of the mobile game by the flexible graphics enhancement and execution component, which results in enhanced image 720.

Figure 8:
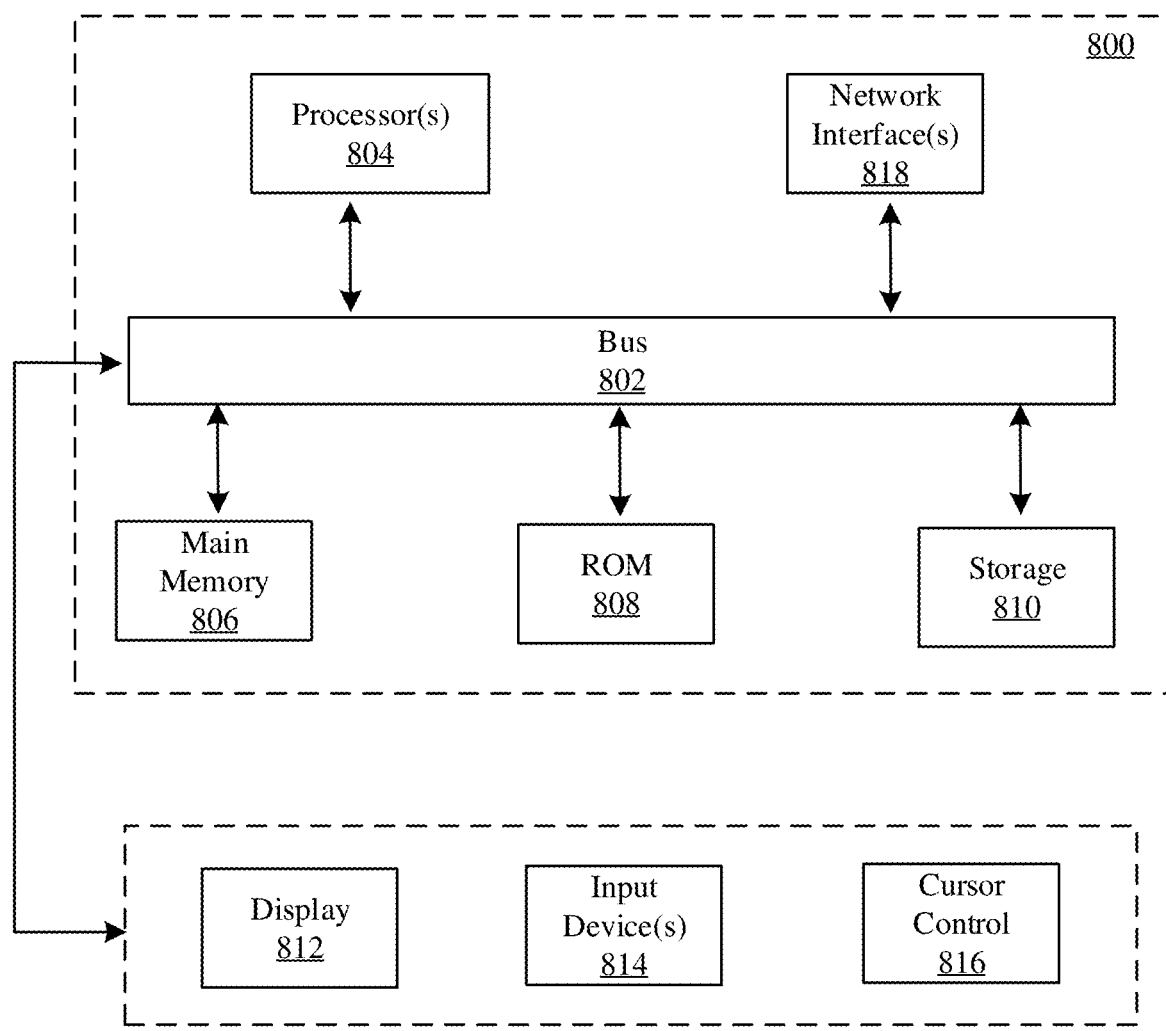
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computer system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component" "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media" and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways.

Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method, comprising:
   intercepting an initial function call, wherein the initial function call is associated with a graphics application programming interface (API) rendering an image for an application;
   automatically generating a custom function based on the intercepted initial function call; and
   returning a pointer associated with the generated custom function to the application, wherein the custom function modifies an output from the graphics API to add a visual effect to a three-dimensional (3D) rendered image of the application;

wherein the method further comprises:
in response to intercepting the initial function call, detecting a signature associated with the graphics API, selecting a caching policy corresponding to the detected signature associated with the graphics API, and caching commands associated with the intercepted function call based on the caching policy.

2. The computer-implemented method of claim 1, further comprising:
in response to returning the pointer associated with the generated custom function to the application, receiving a custom function call from the application.

3. The computer-implemented method of claim 1, further comprising:
selecting an execution mode to apply to the cached commands.

4. The computer-implemented method of claim 3, wherein the applied execution mode is selected from a group of execution modes comprising: an immediate execution mode, a deferred execution mode, and a multithread execution mode.

5. The computer-implemented method of claim 4, further comprising:
in response to selecting the immediate execution mode, immediately executing the cached commands.

6. The computer-implemented method of claim 4, further comprising:
in response to selecting the deferred execution mode, executing the cached commands at a delayed time.

7. The computer-implemented method of claim 4, further comprising:
in response to selecting the multithread execution mode, executing the cached commands at a delayed time and using a separate thread.

8. The computer-implemented method of claim 1, wherein the application is a mobile game.

9. The computer-implemented method of claim 1, wherein the interception of the initial function call, the generation of the custom function, and the returning of the pointer are all performed in a graphics API layer, and the API layer is below an application layer and above a driver layer.

10. A computer system for generating a three-dimensional (3D) rendered image comprising:
an application layer, wherein the application layer comprises an application;
a driver layer, comprising a graphics driver; and
a graphics application programming interface (API) layer between the application layer and the driver layer, wherein the graphics API layer comprises a graphics API and a component configured to execute machine readable instructions to:
intercept an initial function call from the application layer, wherein the initial function call is associated with a graphics application programming interface (API) rendering an image for an application;
automatically generate a custom function based on the intercepted initial function call; and
return a pointer associated with the generated custom function to the application layer, wherein the custom function modifies an output from the graphics API to add a visual effect to the 3D rendered image of the application;

wherein the graphics API layer further comprises a graphics API and a component configured to:
in response to intercepting the initial function call, detect a signature associated with the graphics API;
select a caching policy corresponding to the detected signature; and
cache commands associated with the intercepted function call based on the caching policy.

11. The computer system of claim 10, wherein the graphics API layer comprises a graphics API and a component further configured to:
in response to returning the pointer associated with the generated custom function to the application, receive a custom function call from the application.

12. The computer system of claim 10, wherein the graphics API layer comprises a graphics API and a component further configured to:
select an execution mode to apply to the cached commands,
wherein the applied execution mode is selected from a group of execution modes comprising: an immediate execution mode, a deferred execution mode, and a multithread execution mode.

13. The computer system of claim 12, wherein the graphics API layer comprises a graphics API and a component further configured to:
in response to selecting the immediate execution mode, immediately execute the cached commands; or
in response to selecting the deferred execution mode, execute the cached commands at a delayed time; or
in response to selecting the multithread execution mode, execute the cached commands at a delayed time and using a separate thread.

14. The computer system of claim 10, wherein the graphics API comprises an Open Graphics Library (OpenGL) API.

15. The computer system of claim 14, wherein the graphics API layer comprises an EGL library, and the initial function call is intercepted in the EGL library.

16. The computer system of claim 10, wherein the application is a mobile game.

17. The computer system of claim 10, wherein the visual effect added to the 3D rendered image of the application at least comprises reverting original colors of the 3D rendered image of the application.

18. An electronic device, comprising:
one or more processors; and
a memory having instructions stored thereon, the instructions, when being executed by the one or more processors, cause the one or more processors to:
intercept an initial function call, wherein the initial function call is associated with a graphics application programming interface (API) rendering an image for an application;
automatically generate a custom function based on the intercepted initial function call; and
return a pointer associated with the generated custom function to the application, wherein the custom function modifies an output from the graphics API to add a visual effect to a three-dimensional (3D) rendered image of the application;

wherein the instructions further cause the one or more processors to:
in response to intercepting the initial function call, detect a signature associated with the graphics API;
select a caching policy corresponding to the detected signature; and cache commands associated with the intercepted function call based on the caching policy.

19. The electronic device of claim 18, wherein the visual effect added to the 3D rendered image of the application at least comprises reverting original colors of the 3D rendered image of the application.

20. The electronic device of claim 18, wherein the instructions further cause the one or more processors to:
cache per-frame data in a frame data pool, and cache persistent data in a persistent data pool, wherein the per-frame data is data which is no longer valid after end of a frame, and the persistent data is data which needs to be kept in cache for multiple frames.

* * * * *